(12) United States Patent  (10) Patent No.: US 6,672,346 B1
Heckmaier  (45) Date of Patent: Jan. 6, 2004

(54) PALM TREE TRIMMING MACHINE

(76) Inventor: Rainer F. Heckmaier, 1135 "D" Cornell Ave., Redlands, CA (US) 92374

( * ) Notice: Subject to any disclaimer, the term of this patent is extended or adjusted under 35 U.S.C. 154(b) by 0 days.

(21) Appl. No.: 10/318,479

(22) Filed: Dec. 13, 2002

Related U.S. Application Data (60) Provisional application No. 60/221,897, filed on Oct. 24, 2000, and provisional application No. 60/352,768, filed on Jan. 30, 2002.

(51) Int. Cl.⁷ .............................................. A01G 23/095
(52) U.S. Cl. ................. 144/24.13; 47/1.01 R; 144/208.2; 144/343
(58) Field of Search .................. 47/1.01 R; 144/24.13, 144/343; 30/379, 379.5

(56) References Cited

U.S. PATENT DOCUMENTS

| | | | | |
|---|---|---|---|---|
| 2,583,971 A | * | 1/1952 | Shuff | 144/24.13 |
| 3,364,962 A | * | 1/1968 | Oherbach et al. | 144/24.13 |
| 3,454,058 A | * | 7/1969 | Fend | 144/24.13 |
| 3,457,973 A | * | 7/1969 | Meier | 144/24.13 |
| 3,500,883 A | * | 3/1970 | Herolf et al. | 144/24.13 |
| 4,690,184 A | * | 9/1987 | Fuminao | 144/24.13 |
| 5,438,793 A | | 8/1995 | Eliachar et al. | |
| 5,983,966 A | * | 11/1999 | Clouston | 144/24.13 |
| 6,474,377 B1 | | 11/2002 | Van De Mortel | |

* cited by examiner

Primary Examiner—W. Donald Bray
(74) Attorney, Agent, or Firm—George H. Morgans; Mark A. Manley (57) ABSTRACT

The preferred embodiment of the present invention is a tree trimming apparatus comprising a resilient frame, upright assemblies, drive assemblies, resilient alignment bar assemblies, spring tensioner assemblies, a buss assembly, and saw assemblies.

15 Claims, 15 Drawing Sheets

PALM TREE TRIMMING MACHINE

CROSS REFERENCES TO RELATED APPLICATIONS

Provisional Application for Patent No. 60/221,897 of Oct. 24, 2000 with the title "Palm Tree Trimming Device" which is hereby incorporated by reference.

Provisional Application for Patent No. 60/352,768 of Jan. 30, 2002, with the title, "Palm Tree Trimming Machine" which is hereby incorporated by reference. Applicant claims priority pursuant to 35 U.S.C. Par. 119(e)(i).

STATEMENT AS TO RIGHTS TO INVENTIONS MAKE UNDER FEDERALLY SPONSORED RESEARCH AND DEVELOPMENT

Not applicable

1. Field of the Invention

The present invention is an apparatus for trimming trees such as, but not restricted to, palm trees.

2. Background Information

Removing dead and dying branches from trees, as well as stubble left by previous cutting is dirty, tiring, and dangerous work.

As will be seen in the subsequent description, the preferred embodiment of the present invention overcomes shortcomings of existing methods and equipment used for trimming trees, especially palm trees.

SUMMARY OF THE INVENTION

The present invention, in the preferred embodiment, is a tree trimming apparatus for trimming branches and bark from trees, such as, but not restricted to, palm trees, comprising a resilient frame, upright assemblies, drive assemblies, resilient alignment bar assemblies, spring tensioner assemblies, a buss assembly, and saw assemblies.

DESCRIPTION OF THE PREFERRED EMBODIMENTS

Figure 3:
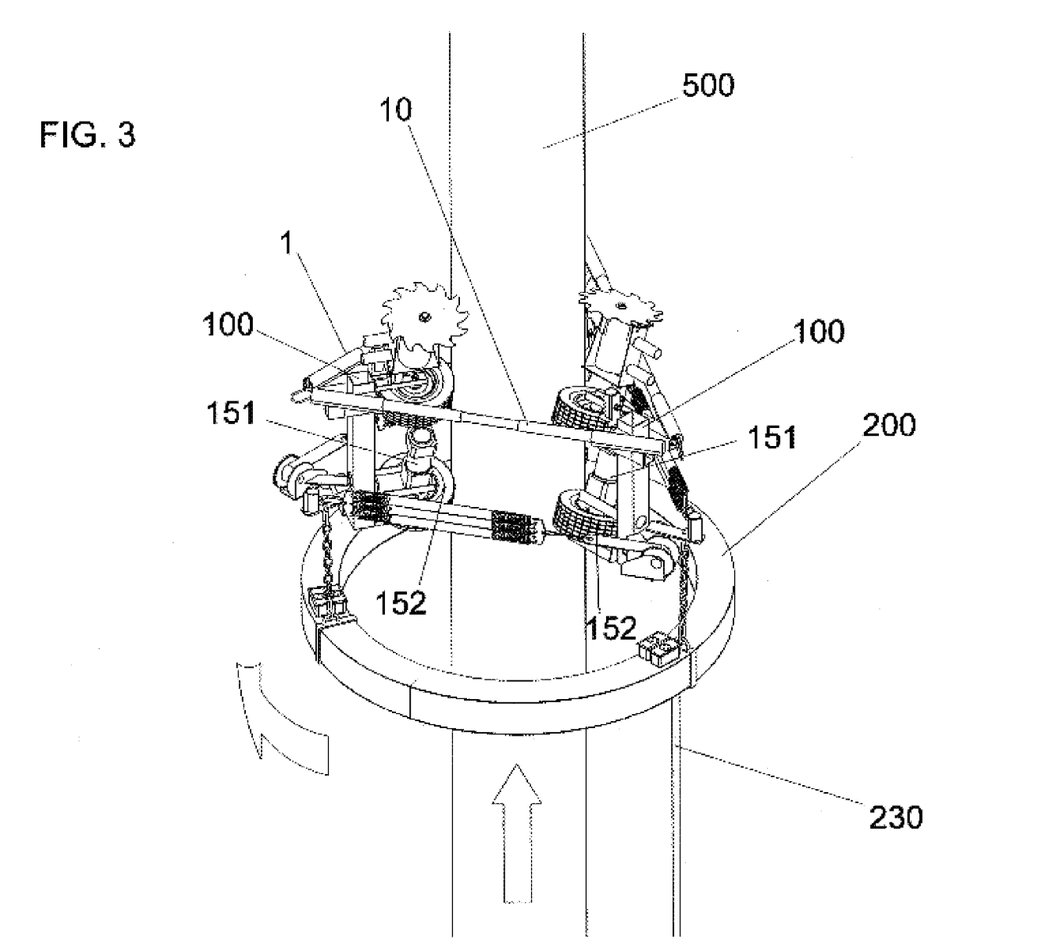
FIG. 3 is a view of the tree trimming apparatus installed on a tree.
Figure 4:
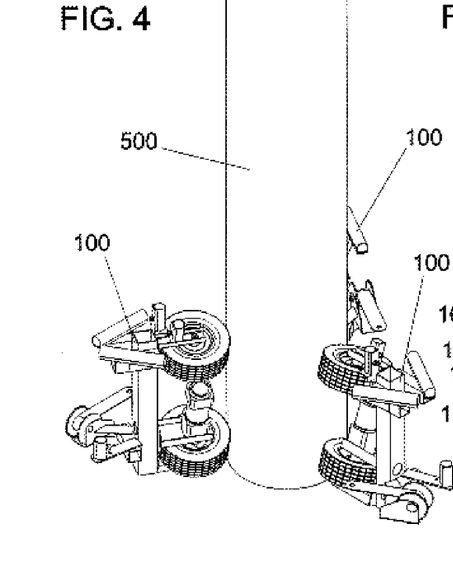
FIGS. 4, 5, 6, and 7 illustrate the tree trimming apparatus in various stages of assembly on a tree.
Figure 5:
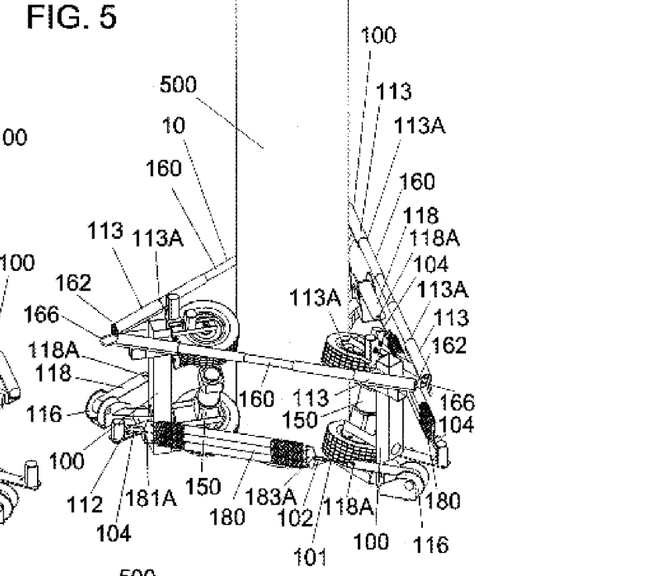

Referring to FIGS. 1 through 9, a tree trimming apparatus 1, comprises a resilient frame 10 (Ref. FIGS. 3 and 5), upright assemblies 100, a buss assembly 200 comprising a first buss half 210 and a second buss half 220, a control cable 230 and at least one saw assembly 300.

The resilient frame 10, which surrounds a tree 500 in FIG. 5, comprises resilient alignment bar assemblies 160 and spring tensioner assemblies 180.

Figure 9:
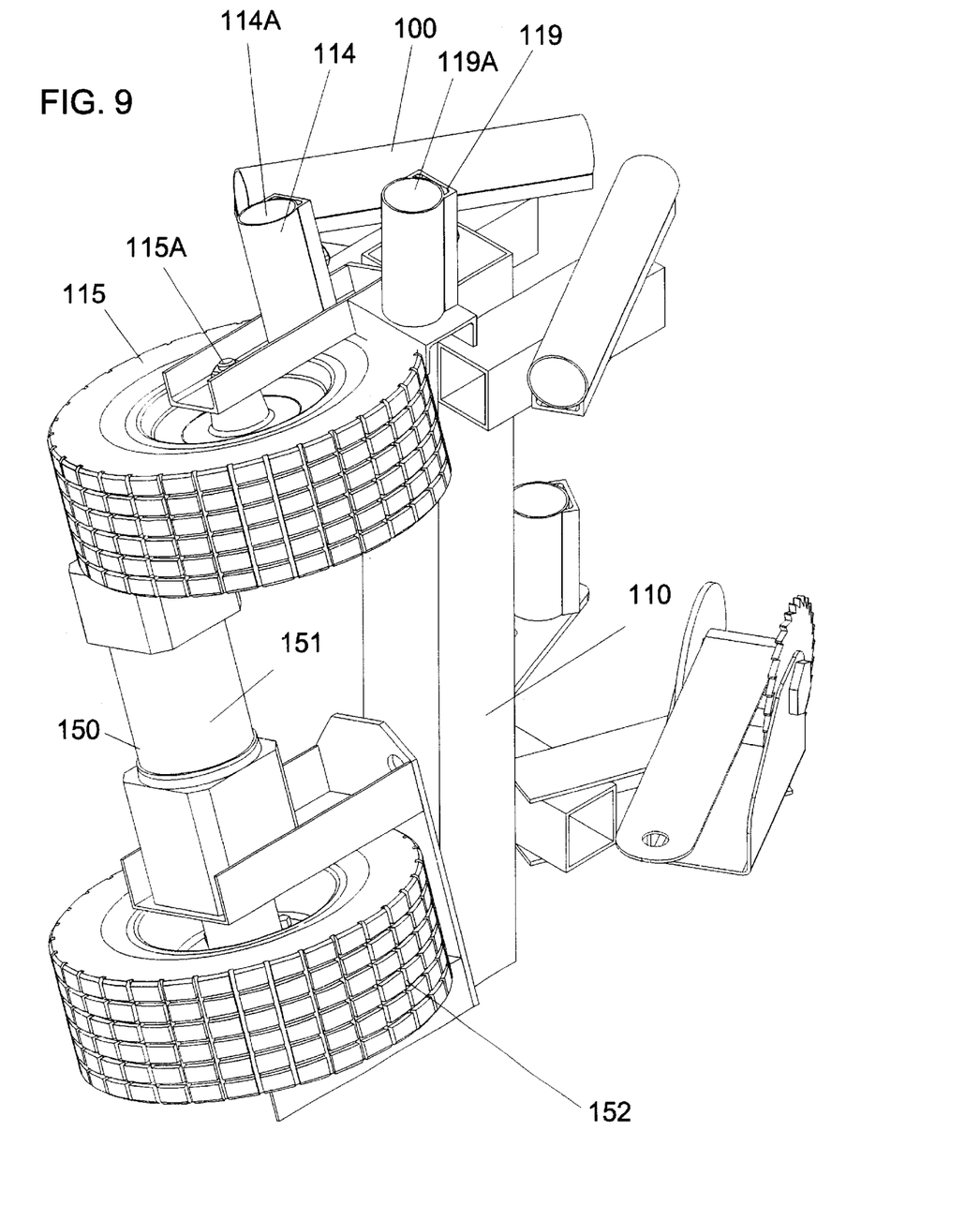
FIG. 9 illustrates an upright assembly.

Each upright assembly 100 comprises an upright 110, an idler wheel mount assembly 115, an idler wheel axle 115A and a drive assembly 150.

Each drive assembly 150 comprises a motor 151 and a drive wheel 152.

Figure 8:
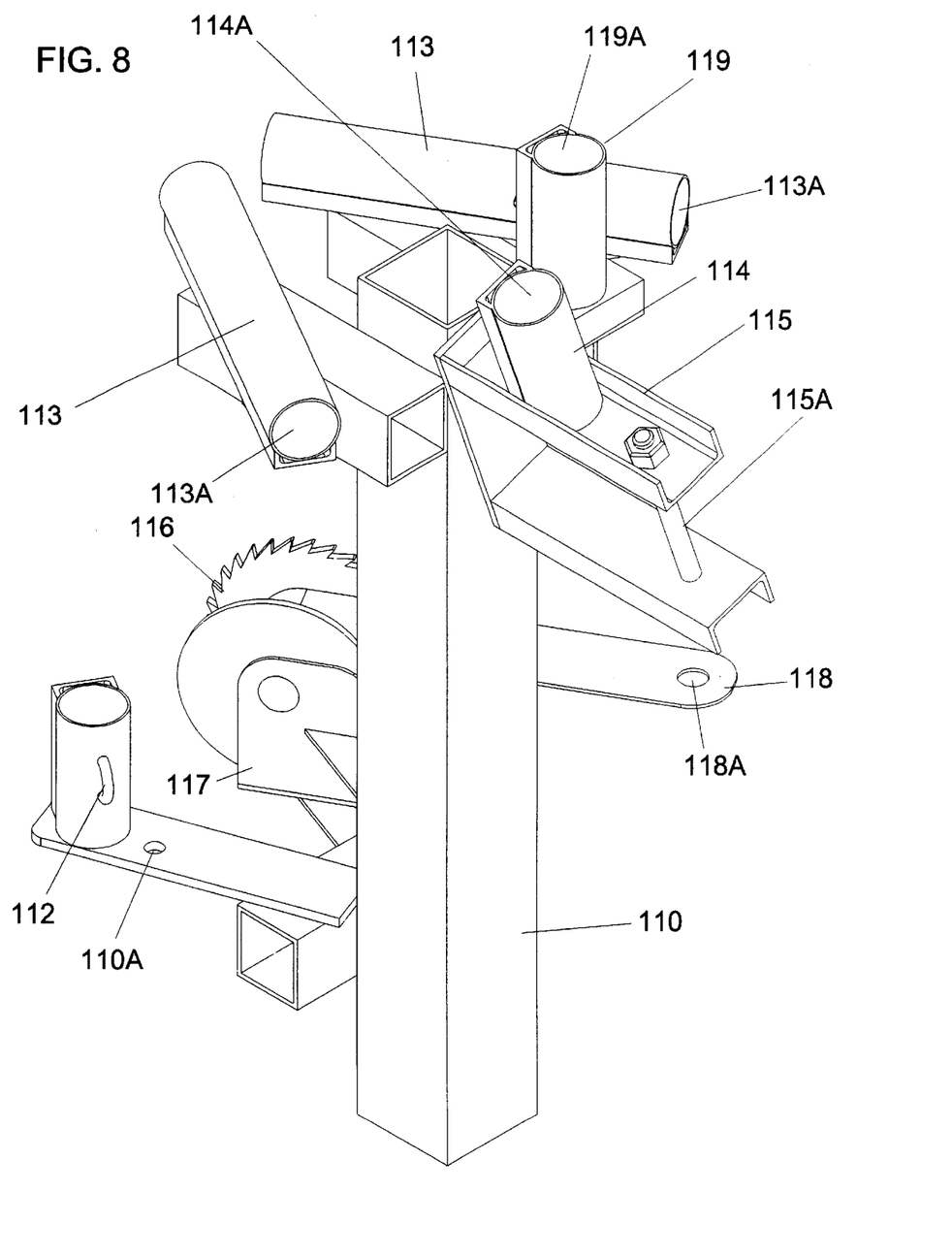
FIG. 8 illustrates an upright.

Each upright 110 comprises a chain mount carabiner clip clearance hole 110A, a tensioner mount 112, alignment bar guides 113 each with an alignment bar assembly opening 113A, a tool mount 114 comprising a saw mount opening 114A, a tensioner ratcheting lock 116, a ratcheting lock mount 117, a flexible strap 118 comprising a tensioner mount cable clearance hole 118A, and an alternate tool mount 119 with an alternate saw mount opening 119A. The tensioner ratcheting lock 116 serves as a means of adding tension to the spring tensioner assembly 180.

Figure 10:
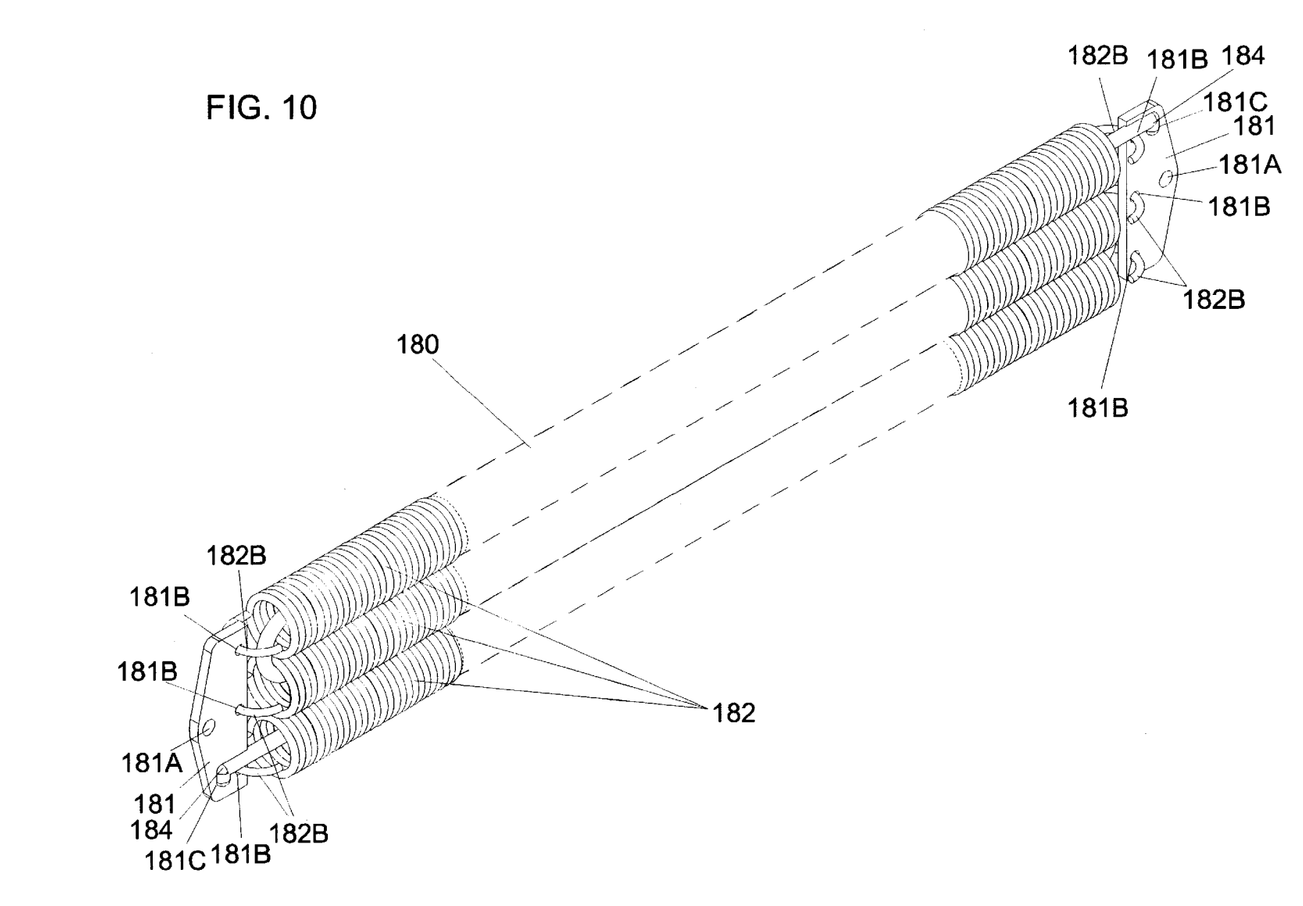
FIG. 10 illustrates a spring tensioner assembly.

Referring to FIG. 10, the spring tensioner assembly 180 comprises end plates 181, springs 182 with spring ends 182B, and a bungie safety strap 184. Each end plate 181 comprises a mount clip clearance hole 181A, spring end clearance holes 181B, and a safety strap clearance hole 181C. Each spring end 182B fits into a corresponding spring end clearance hole 181B. The bungle safety strap 184 is attached to each of the end plates 181 at the safety strap clearances holes 181C.

The springs 182 are attached to the end plates 181 by means of inserting the spring ends 182B of the springs 182 into the spring clearance holes 181B of the end plates 181.

Figure 11:
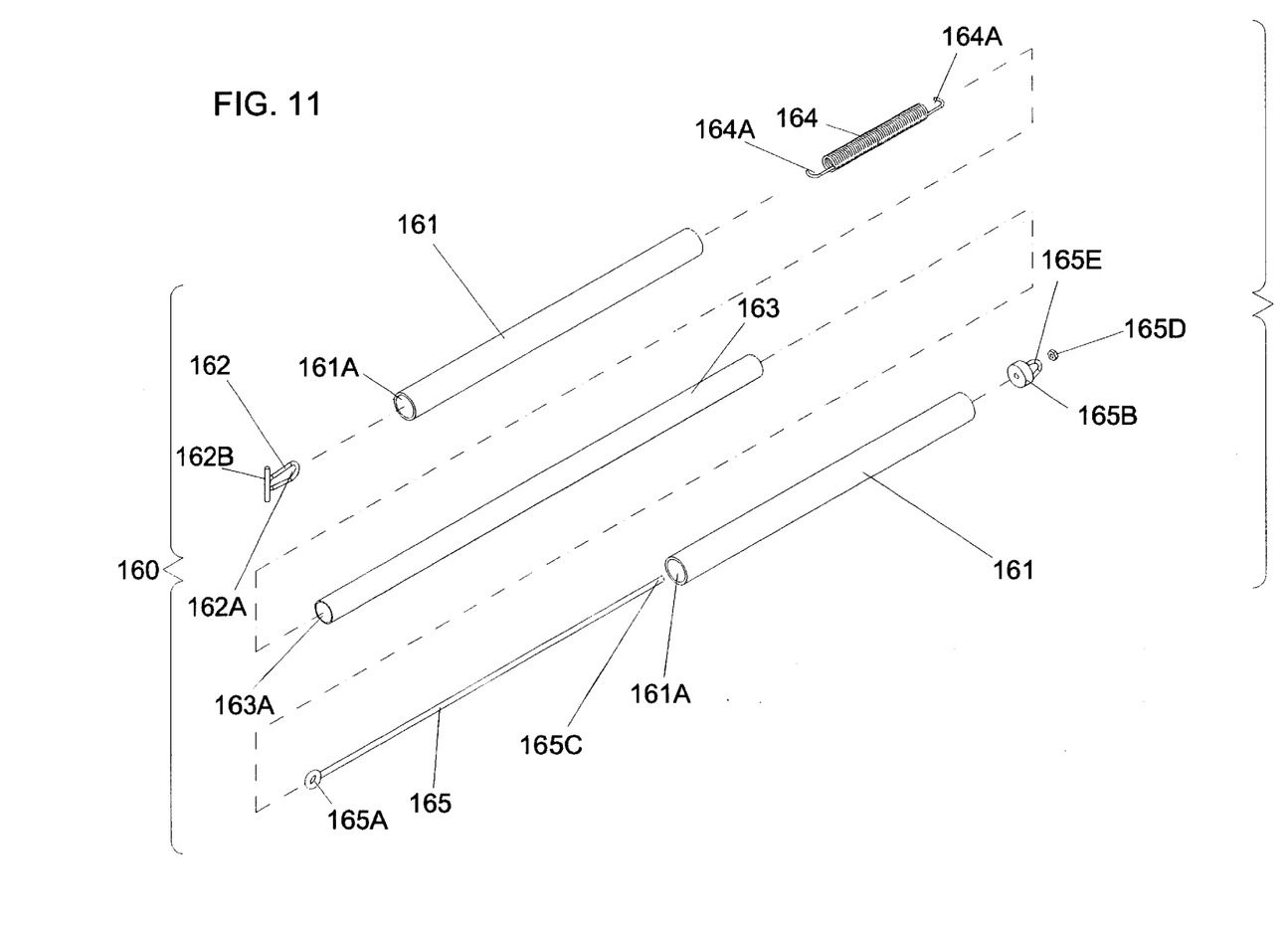
FIG. 11 is an exploded view of the resilient alignment bar assembly.

Referring to FIG. 11, the resilient alignment bar assembly 160 comprises an end cap 165B with an eye 165E, a nut 165D, outer tubes 161 each with a opening 161A, a spring extension 165 with a rod eye end 165A and a threaded end 165C, an inner tube 163 with a small tube opening 163A, an alignment bar spring 164 with hooks 164A, and a loop assembly 162 comprising a hook opening 162A, and a pin 162B, The outer tubes 161 are biased to be drawn over the inner tube 163 by means of the spring 164 which is connected to the loop assembly 162 with one of the hooks 164A and to the rod eye end 165A of the spring extension 165, with the end cap 165B held on the spring extension 165 by means of the nut 165D.

Figure 1:
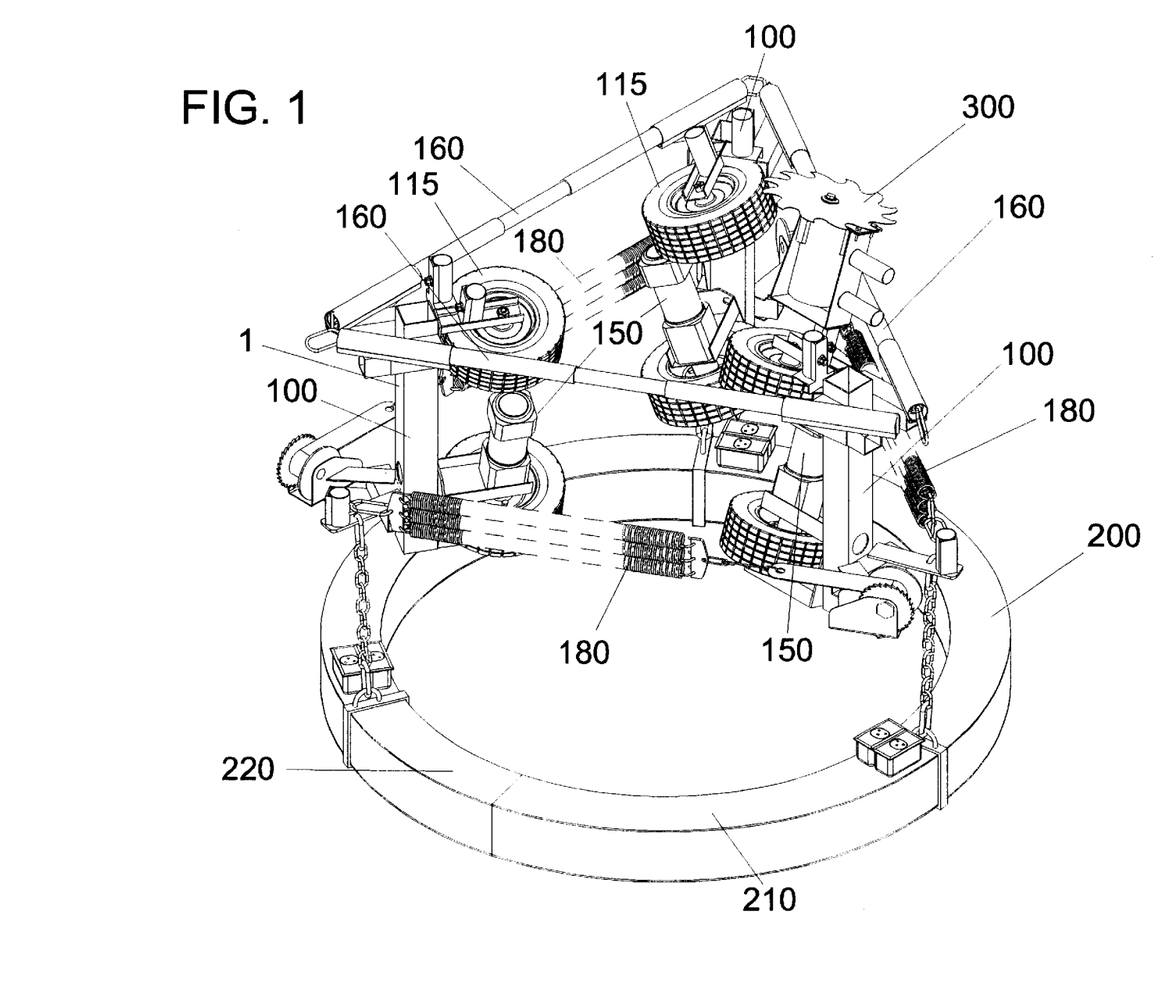
FIG. 1 illustrates the preferred embodiment of the present invention, a tree trimming apparatus.
Figure 2:
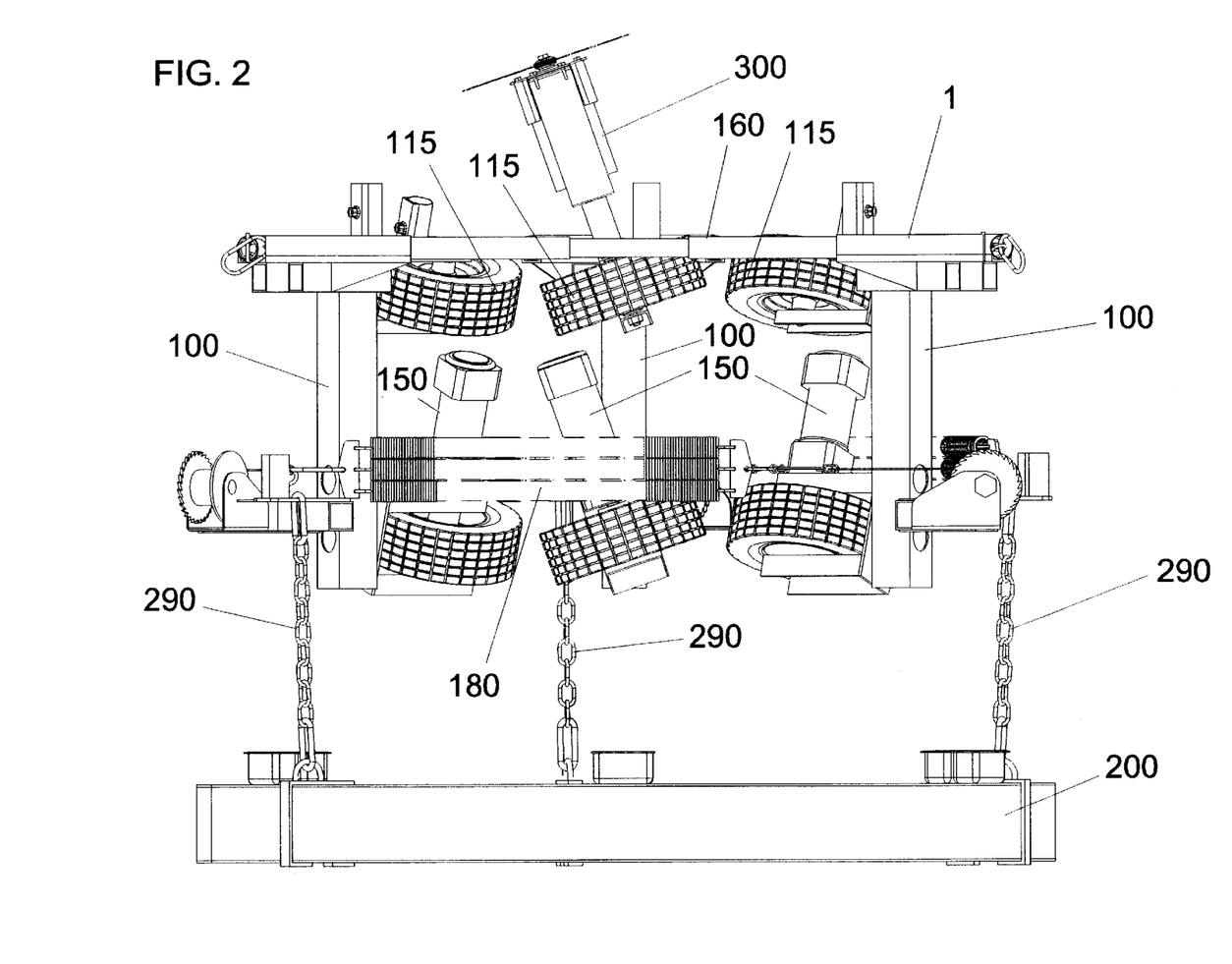
FIG. 2 is a plan view of the tree trimming apparatus.
Figures 6, 7:
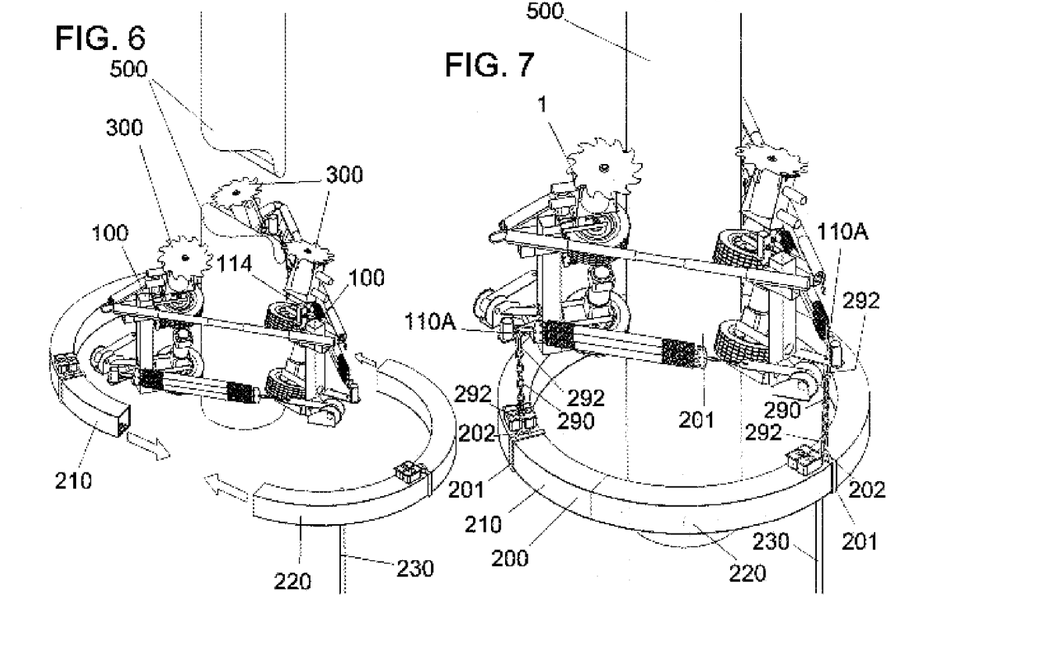

The loop assembly 162 restrains the alignment bar spring 164 which is connected to the spring extension 165 which is connected to the end cap 165B, said end cap 165B being held in position on the distal alignment bar guide 113 (Ref. FIG. 8) of one of the upright assemblies 100 of the tree trimming apparatus 1 (Ref. FIG. 1) by a carabiner clip 292 (Ref. FIG. 7) and on the proximate alignment bar guide 113 by the loop assembly 162 (Ref. FIG. 7).

Figure 12:
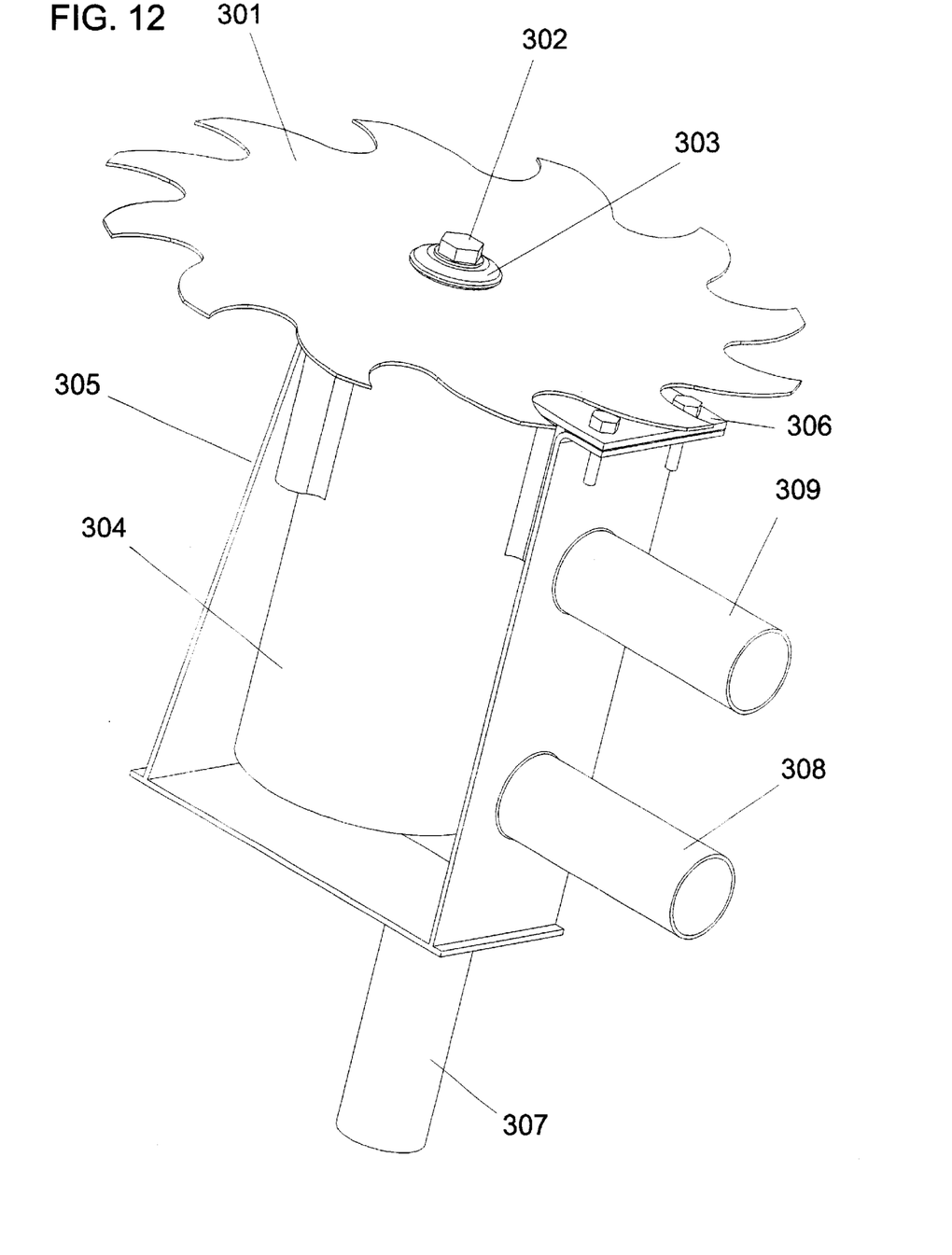
FIG. 12 illustrates a saw assembly.

Referring to FIGS. 6 and 12, the saw assembly 300 (Ref. FIG. 6) comprises (Ref. FIG. 12) a rotary saw blade 301, a mount bolt 302, a mount washer 303, a motor 304, a saw mount housing 305, a motor mount plate 306, a saw mount 307, a first alternate saw mount 308, and a second alternate saw mount 309.

Referring to FIGS. 1, and 13–17, the buss assembly 200 comprises the first buss half 210 and the second buss half 220, which further comprise mount reinforcements 201, mount rings 202, clip halves 204A and clip locks 204B, clearance slots 205, conductor elements 206, AC buss electrical wiring 207, DC buss electrical wiring 208, trolley clearances 209, AC electrical connection boxes 211 and 221, DC electrical connection boxes 212 and 222, contact trolley 250, electrical contact assembly rollers 251 A, B, C, and D, cable shield 252, electrical connections (from the control cable 230 to contact assemblies 251) 253 A, B, C, and D, roller spring assemblies 254 which force the contact trolley 250 securely against conductor elements 206, control cable shield clearance hole 255, chains 290, and (Ref. also FIG. 7) carabiner mount clips 292.

Figure 18:
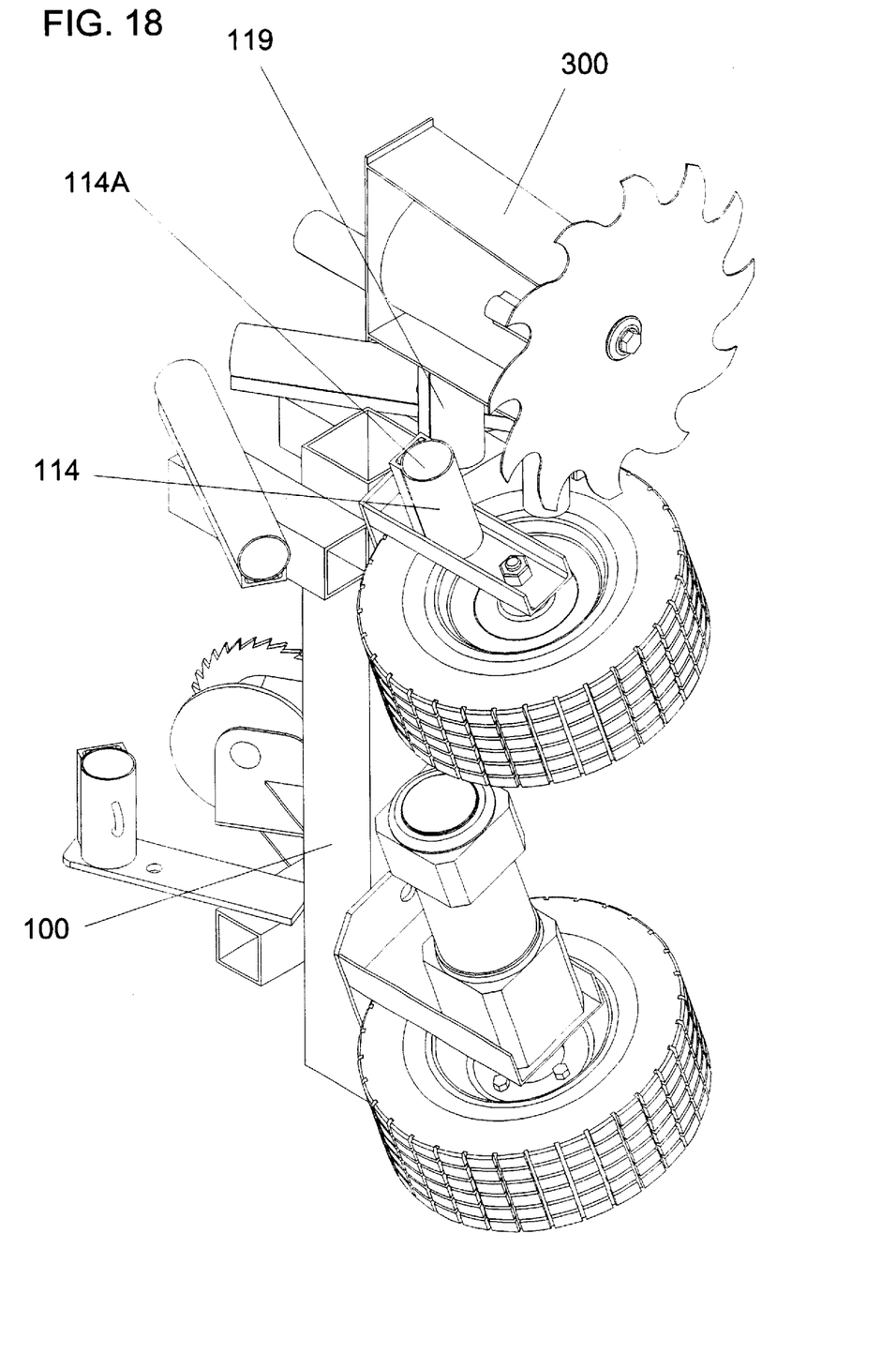
FIG. 18 illustrates an alternate saw assembly mount.

Referring to FIG. 18, depending on which types of cuts desired, The saw assembly 300 can be inserted into the alternate tool mount 119 as opposed to tool mount 114 shown with the tool mount opening 114A, on the upright assembly 100.

Figure 19:
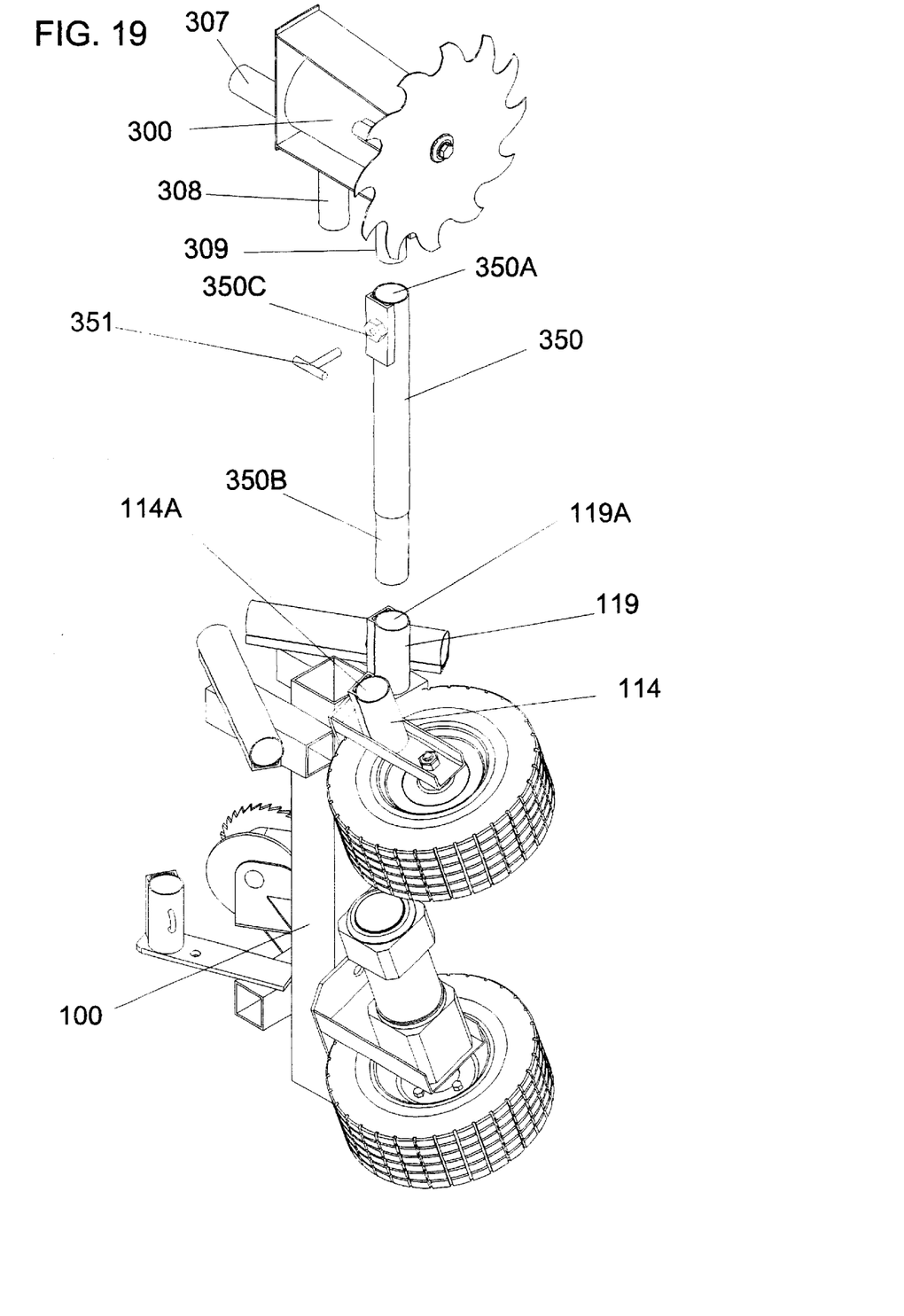
FIG. 19 illustrates an extended alternate saw assembly mount.

Referring to FIG. 19, an extension 350 can be inserted into the alternate tool mount 119. The extension 350 comprises an extension opening 350A, a reduced outer diameter 350B, and a lock 350C, 351.

The saw assembly 300 is shown with the saw mount 307, the first alternate saw mount 308, and the second alternate saw mount 309 each of which will fit into either the extension opening 350A or the tool mount opening 119A.

To assemble the tree trimming apparatus 1 around the tree 500, as shown in FIG. 3, refer to FIGS. 4 through 7.

In FIG. 4, three upright assemblies 100 are placed around the tree 500.

In FIG. 5, the resilient alignment bar assemblies 160 are inserted into alignment bar assembly opening 113A of the alignment bar guides 113.

Each of the spring tensioner assemblies 180 is attached to a tensioner attachment 104 which is attached to the tensioner mount 112 as well as to a second tensioner attachment 102 which is attached to a cable 101 which is attached to the tensioner mount cable clearance hole 118A of the flexible strap 118 which is attached to the tensioner ratcheting lock 116, said tensioner ratcheting lock 116 serving as a means of adding tension to the spring tensioner assembly 180.

In FIG. 6, the first buss half 210 is connected to the second buss half 220 with the control cable 230.

The saw assembly 300 is shown mounted on the tool mount 114 on one of the upright assemblies 100.

In FIG. 7, the assembly of the tree trimming apparatus 1 is completed by adding the chains 290 with carabiner mount clips 292 to connect to the mount rings 202 attached to the mount reinforcements 201 of said buss halves 210 and 220 of the buss assembly 200 and the chain mount carabiner clip clearance hole 110A.

Once assembled around the tree 500, the resilient alignment bar 160 with the resilient alignment bar springs 164 and the spring tensioner assemblies 180 of the resilient frame 10 tend to resiliently hold the drive assemblies 150 tight against the tree 500. The tensioner ratchet locks 116 can be adjusted to increase pressure of the drive wheels 152 against the tree 500.

The saw assembly 300 can be mounted in the tool mount 114 or in the alternate tube mount 119 depending on the type of trim desired on the tree. The saw assembly 300 will maintain a constant distance from the tree by virtue of being mounted to the upright assembly 100 with the idler wheel 115 (Ref. FIG. 9).

Once fully assembled and adjusted, the tree trimming assembly 1 will drive up the tree 500. As the drive wheels 152 turn, they climb the tree 500 and spiral around the tree 500 in accordance with whatever angle the drive wheels 152 were set.

The control cable 230 provides electrical power to the saw assemblies 300 and the motors 151 which can be plugged into the AC electrical connection boxes 211 and 221. The control cable 230 can include a control wand, not shown, that allows an operator to control the saw assemblies 300 and the motors 151, which in the preferred embodiment of the present invention are reversible electric drive motors.

Figure 13:
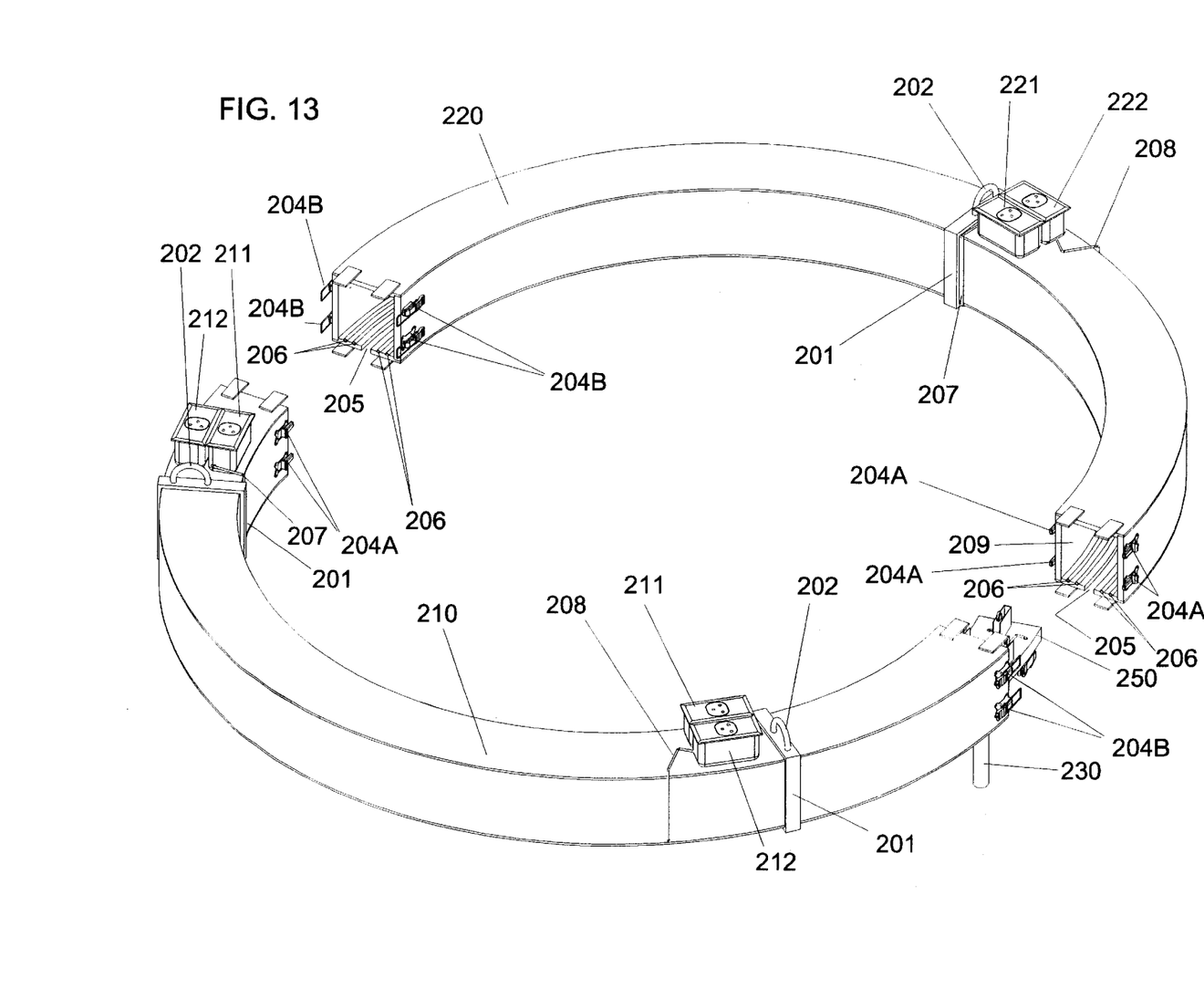
FIGS. 13 through 17 illustrate a buss assembly and related details.
Figure 14:
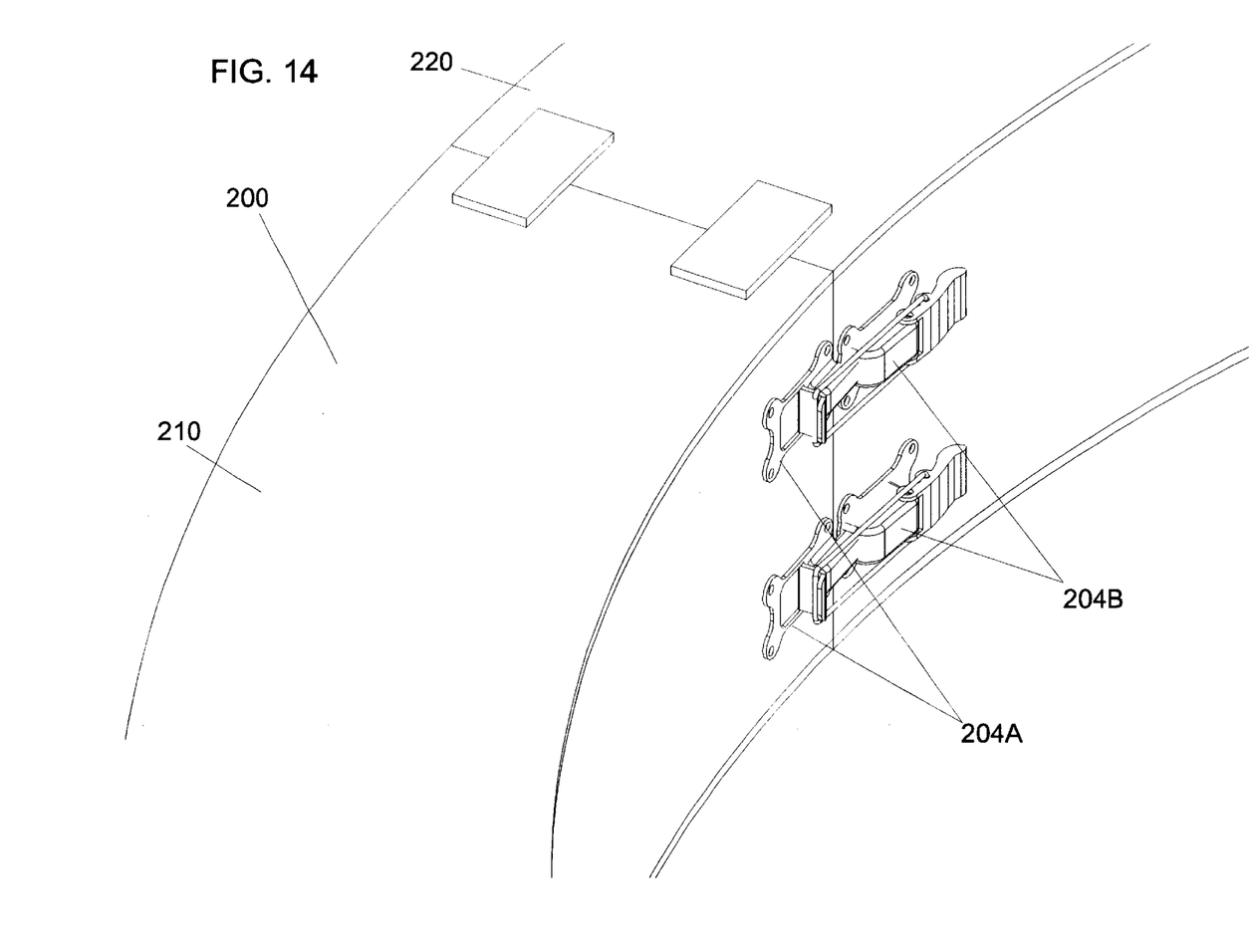
Figure 15:
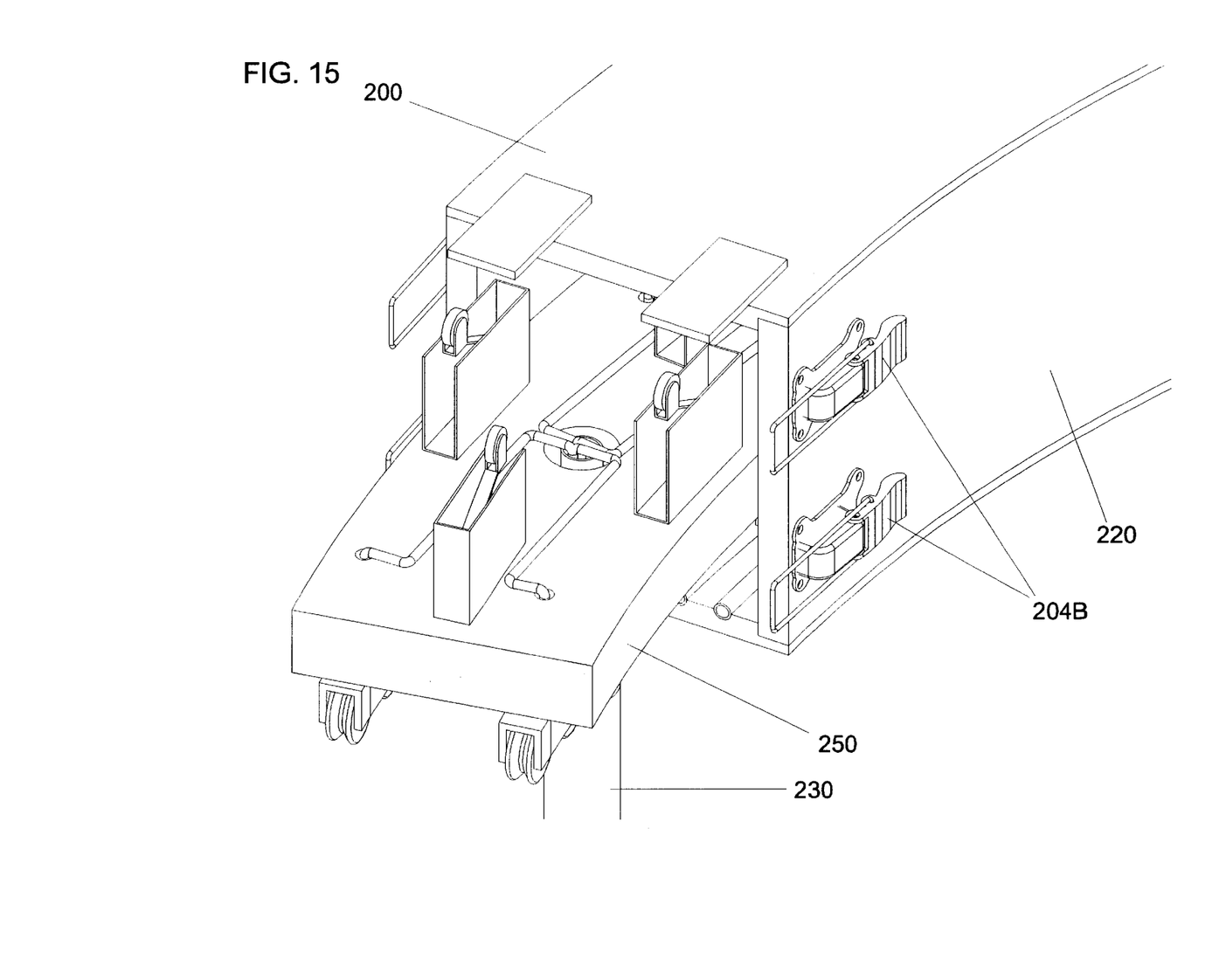
Figure 16:
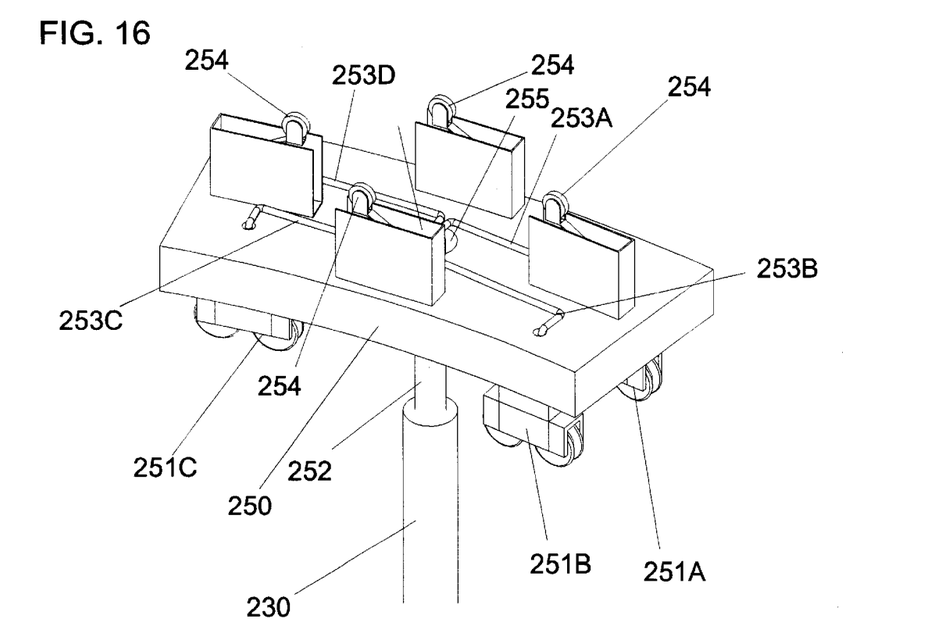
Figure 17:
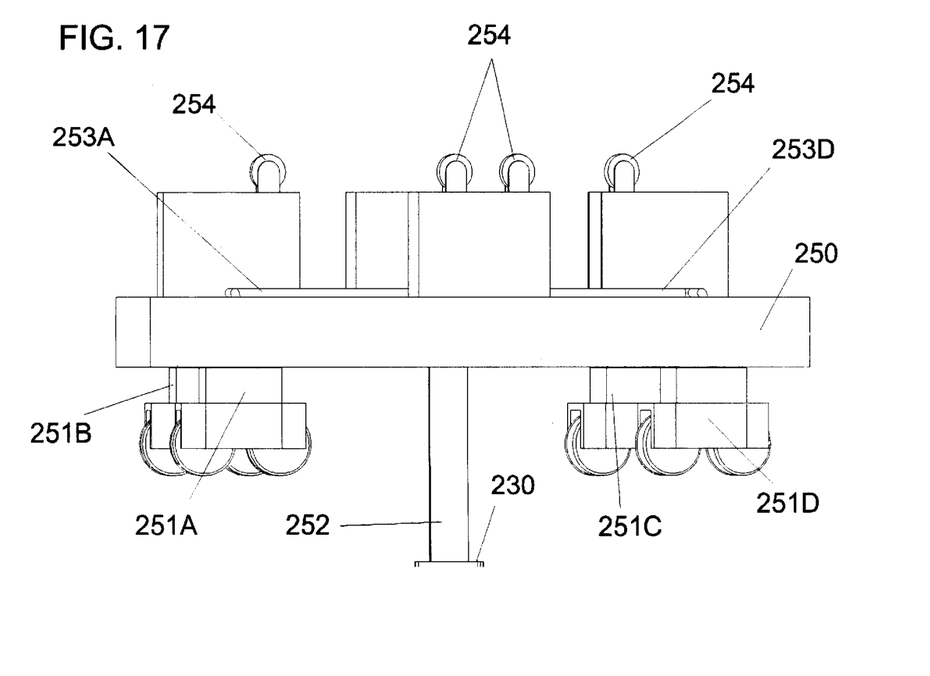

The control cable 230 will stay on one side of the tree 500 by virtue of the contact trolley 250 Ref. FIG. 13) rolling along conductor elements 206 as the buss assembly 200 rotates around the tree 500.

The rotation and climbing motion of the tree trimming assembly 1 allows the saw assemblies 300 to trim off dead leaves, branches, and trunk material from the tree 500 along the axial length of the tree 500. While the control cable 230 can stay in one location as the tree trimming assembly 1 rotates, the operator holding the control cable 230 can also move around the tree to see the work on any side of the tree 500 and the contact trolley will simply follow the operator's motion around the tree 500.

Although the description above contains many specificities, these should not be construed as limiting the scope of the invention but as merely providing illustrations of some of the presently preferred embodiments of this invention.

While the saw assemblies 300 can be mounted to the tool mounts 114 and to the alternate tool mounts 119, it will be understood that the saw assemblies 300 can be mounted to manually adjustable sleds that would allow the operator to adjust the position of the saw assemblies 300 relative to the drive wheel 152.

It will be obvious to those skilled in the art that modifications may be made to the embodiments described above without departing from the scope of the present invention. Thus the scope of the invention should be determined by the appended claims in the formal application and their legal equivalents, rather than by the examples given.

I claim:

1. A self-propelled, climbing tree trimming apparatus for climbing a tree in an axial direction comprising:
    a plurality of drive assemblies, each of said drive assemblies comprising a drive wheel, a drive motor, and a tool mount;
    a plurality of tensioners and resilient bars said tensioners and resilient bars including attachments such that said tensioners and resilient bars are inter-connectable to form a resilient frame surrounding the tree;
    said drive assemblies mounted on said resilient frame such that the drive wheel of each drive assembly is mounted at an angle to said tree axis and are urged into contact with the tree such that when each said drive wheel rotates, said frame moves in an axial direction along said tree while simultaneously rotating around said tree.

2. The self-propelled climbing tree trimming apparatus of claim 1 wherein a saw assembly including a rotary saw blade is mounted to said tool mount.

3. The self-propelled climbing tree trimming apparatus of claim 2 wherein an electrical buss assembly is attached to said resilient frame and provides power to said drive motor and to said saw assembly, and wherein said buss assembly includes a track mounted trolley that remains rotationally fixed while a remaining portion of said buss assembly rotates with said resilient frame as said resilient frame rotates and moves axially along the tree.

4. The self-propelled climbing tree trimming apparatus of claim 3 wherein the track mounted trolley comprises a power and control cable.

5. The self-propelled climbing tree trimming apparatus of claim 3 wherein the electrical buss assembly comprises two detachable half ring portions such that the detachable half ring portions may be assembled around the tree.

6. The self-propelled climbing tree trimming apparatus of claim 5 wherein the electrical buss comprises flexible members connecting the electrical buss assembly to the resilient frame.

7. A self-propelled climbing tree trimming apparatus for climbing a tree in an axial direction comprising:

a plurality of drive assemblies, each of said drive assemblies including a drive wheel, a drive motor, and a tool mount;

a resilient frame surrounding the tree;

said drive assemblies mounted on said resilient frame such that the drive wheel of each drive assembly is mounted at an angle to said tree axis and is urged into contact with the tree such that when at least one said drive wheel rotates said frame moves in an axial direction along said tree while simultaneously rotating around said tree.

8. The self-propelled climbing tree trimming apparatus of claim 7 wherein the resilient frame can be disassembled and removed from said tree.

9. The self-propelled climbing tree trimming apparatus of claim 8 wherein the resilient frame includes a plurality of tension springs and wherein the tension in said springs can be adjusted such that the drive wheel of each said drive assembly is urged more strongly into engagement with said tree.

10. The self-propelled climbing tree trimming apparatus of claim 7 wherein a power saw is mounted in said tool mount.

11. A self-propelled climbing tree trimming apparatus for climbing a tree in an axial direction comprising:

a plurality of drive assemblies, each of said drive assemblies comprising a drive wheel, a drive motor, and a tool mount holding a power saw;

a frame surrounding the tree;

said drive assemblies mounted on said frame such that the drive wheel of each drive assembly is mounted at an angle to said tree axis and is urged into contact with the tree such that when each said drive wheel rotates said frame moves in an axial direction along said tree while simultaneously rotating around said tree.

12. The self-propelled climbing tree trimming apparatus of claim 11 wherein an electrical buss assembly is attached to said frame and provides power to said drive motor and to said saw assembly, and wherein said buss assembly includes a track and track mounted trolley that remains rotationally fixed while a remaining portion of said buss assembly rotates with said frame as said frame rotates and moves axially along the tree.

13. The self-propelled climbing tree trimming apparatus of claim 12 wherein the track mounted trolley comprises a power cable.

14. The self-propelled climbing tree trimming apparatus of claim 12 wherein the electrical buss assembly comprises two detachable half ring portions such that the detachable half ring portions may be assembled around the tree to form said track.

15. The self-propelled climbing tree trimming apparatus of claim 14 wherein the electrical buss assembly comprises flexible members connecting the electrical buss assembly to the frame.

* * * * *